United States Patent [19]
Collins et al.

[11] 3,785,464
[45] Jan. 15, 1974

[54] CABLE REEL STRING INSTALLATION

[75] Inventors: Leslie C. Collins, Doylestown, Pa.;
Arthur W. Smith, Trenton, N.J.

[73] Assignee: Eastern Rotocraft Corporation,
Doylestown, Pa.

[22] Filed: Dec. 23, 1971

[21] Appl. No.: 211,581

[52] U.S. Cl. .......................... 191/12.2 R, 242/54 R
[51] Int. Cl. ............................................. H02g 11/02
[58] Field of Search ........................ 242/54 R, 107;
254/150 R; 191/12.2 R

[56] References Cited
UNITED STATES PATENTS

| | | | |
|---|---|---|---|
| 2,374,457 | 4/1945 | Reeves | 191/12.2 R |
| 829,869 | 8/1906 | Hopkins | 191/12.2 R |
| 1,747,411 | 2/1930 | Anderson | 191/12.2 R |
| 1,235,092 | 7/1917 | Atkinson | 191/12.2 R |

*Primary Examiner*—George F. Mautz
*Assistant Examiner*—Edward J. McCarthy
*Attorney*—Harris S. Campbell

[57] ABSTRACT

A cable stored on a reel can be reeled out to any adjusted length within its limit. Control mechanism allows locking the drum for load transfer between the cable and the reel at any adjusted position. A load indicating system is supplied to show when a predetermined load is applied at the loaded end of the cable. For this purpose a pair of electrical conductors extend through the cable and a continuing circuit is supplied from the outer rim of the rotating drum to the stationary reel housing. A clock type spiral spring is supplied to rewind the cable and this spring is split into a plurality of sections which are supported in insulated relationship to the drum and housing. In this way the spring parts are used as conductors in the electrical circuit with suitable connections at the outer end spring attachment and at the inner end spring attachment.

6 Claims, 10 Drawing Figures

PATENTED JAN 15 1974
3,785,464
SHEET 1 OF 4
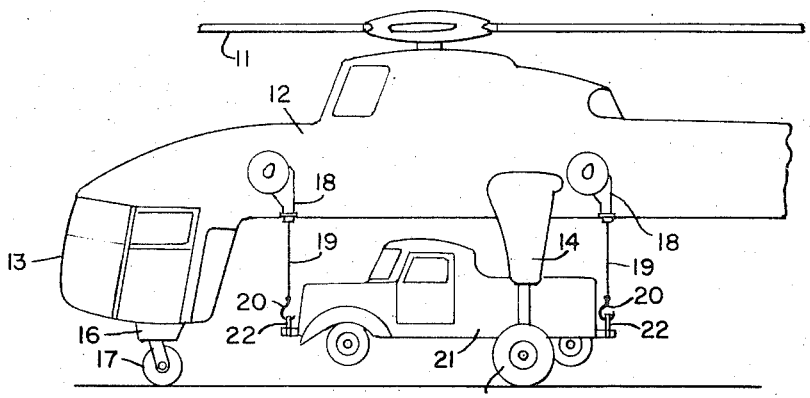
Fig.1.
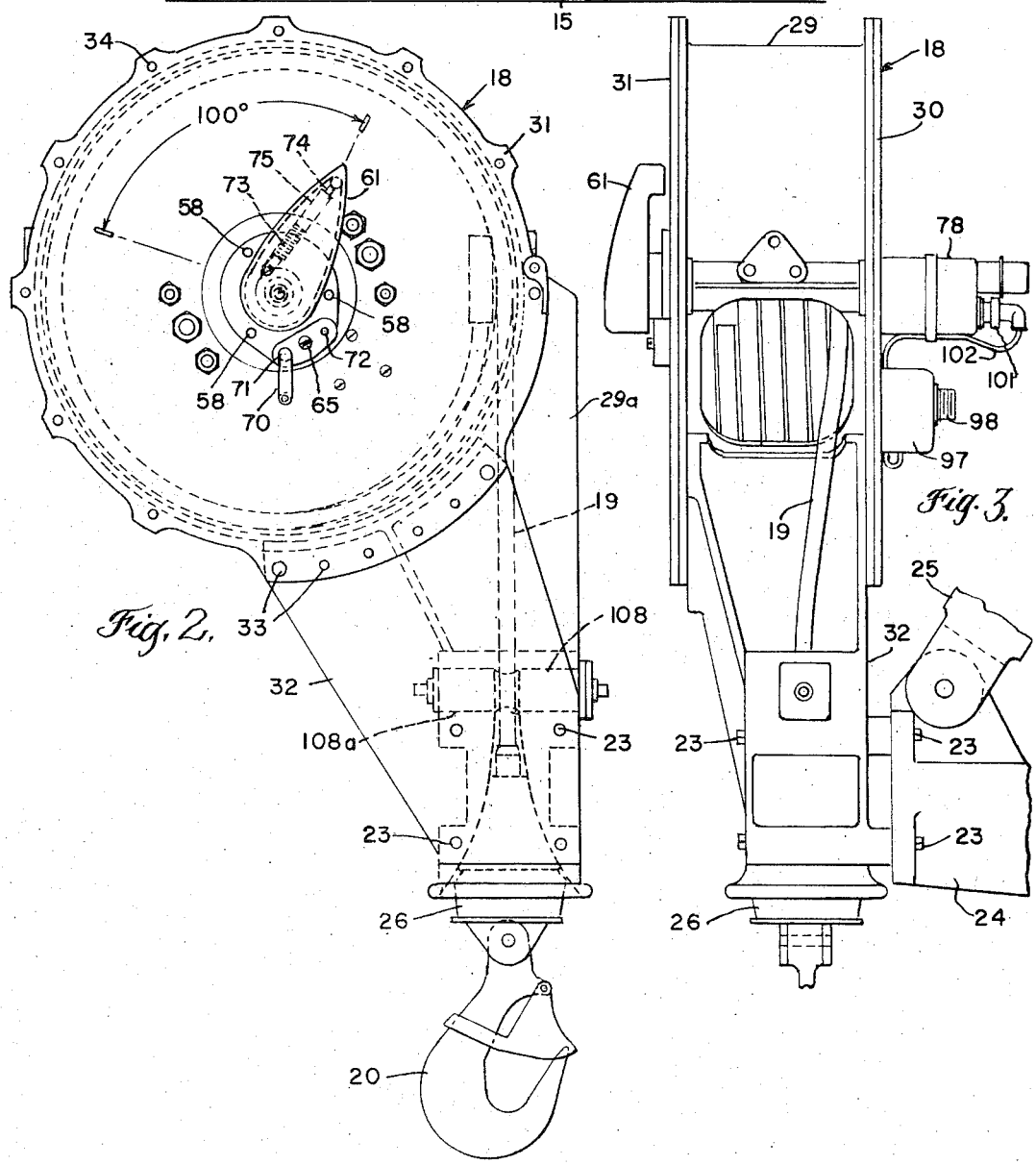
Fig.2.
Fig.3.

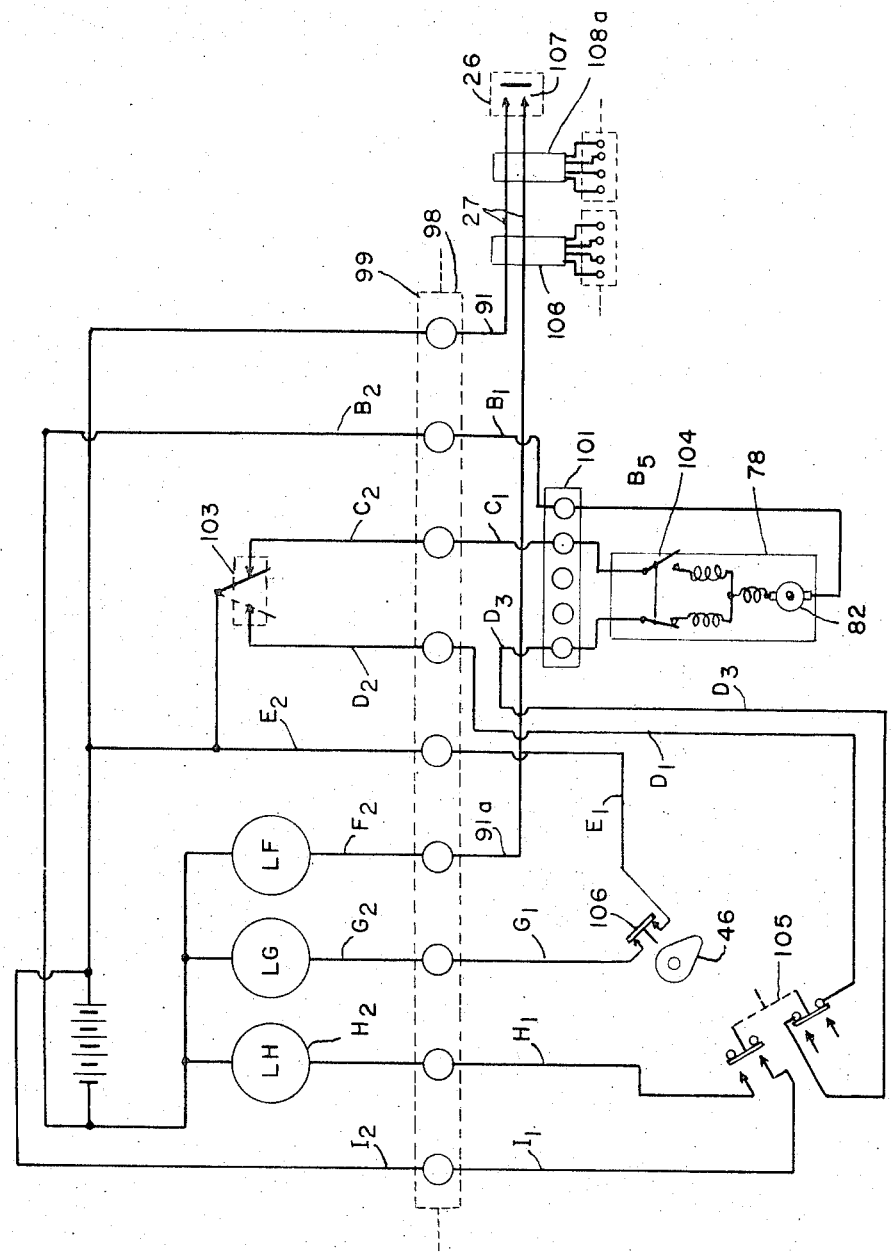

CABLE REEL STRING INSTALLATION

BACKGROUND OF THE INVENTION

The present invention relates to storage reels for load carrying cables and is particularly concerned with reels suitable for mounting on helicopter type aircraft for suspending loads by means of a plurality of cables spaced at different locations on the aircraft to provide a multiple point suspension system. Prior reel systems of this general nature have been equipped with mechanical control systems for locking the cables in adjusted load carrying position. The locking action has been operated from a central location, such as the aircraft operator's position. Each reel incorporates a rewind spring to retract the cable to stored position when the reel is unlocked. The length of unextended cable is controlled by the crewman to the desired adjustment to connect to a load. With the reel unlocked, the cable may be extended against the rewind spring tension to the adjusted position where it is engaged with the load by means of the terminal hook or other suitable attachment device. When all cables are properly adjusted to their load connecting points, the reels are locked to provide for load transfer from the cables to the reels to allow pick up of the load.

In the Leslie C. Collins application, Ser. No. 103,472, filed Jan. 4, 1971, now U.S. Pat. No. 3,683,355, there has been shown a system for supplying a visual indication to the operator of a predetermined load developed at the end of the cable. The present construction incorporates an indicating system of this nature including suitable electrical circuits which require no slip ring contacts.

SUMMARY OF THE INVENTION

Each of the cable reels of the improved system has incorporated in it electrical control operated from a central location with individual mechanical control operable at each reel. The manual safety lock is applied at each reel and when engaged causes interruption of the electrical system for the corresponding reel during the time of application of the safety lock.

In addition to the electrical actuation of the locking and unlocking of the reel, indicator lights with suitable circuits and control switches are provided to show when each reel is "unlocked" and also to show when the safety lock is engaged.

A primary object of the invention is the provision of an electrical circuit which extends from the drum periphery, which is rotatable, to the fixed housing. To act as conductors for the circuit the rewind spring is divided into two separate parallel spring elements or parts supported in insulated relationship to the drum at the outer end of the spring elements and also insulated from the fixed axis structure at the inner end of the spring elements. Also insulating material is used to separate the spring elements from each other and to protect them from undesired contact with other metal parts of the reel. The electrical circuit of the system includes terminal screws at the outer anchor points of the spring elements and also at the inner ends of the elements. By means of these terminals the spring elements can be connected into the electrical circuits in the desired manner.

BRIEF DESCRIPTION OF THE DRAWINGS

How the advantages are accomplished will be evident from the description of the drawings wherein FIG. 1 is a side view of a helicopter aircraft showing one manner in which reels of the present type may be used.

FIG. 2 is an elevational view of one of the reels.

FIG. 3 is a front elevational of the reel shown in FIG. 2 with the cover member removed.

FIG. 10 is an electrical wiring diagram of the internal and external portions of the reel electrical system.

DETAILED DESCRIPTION

Figure 4:
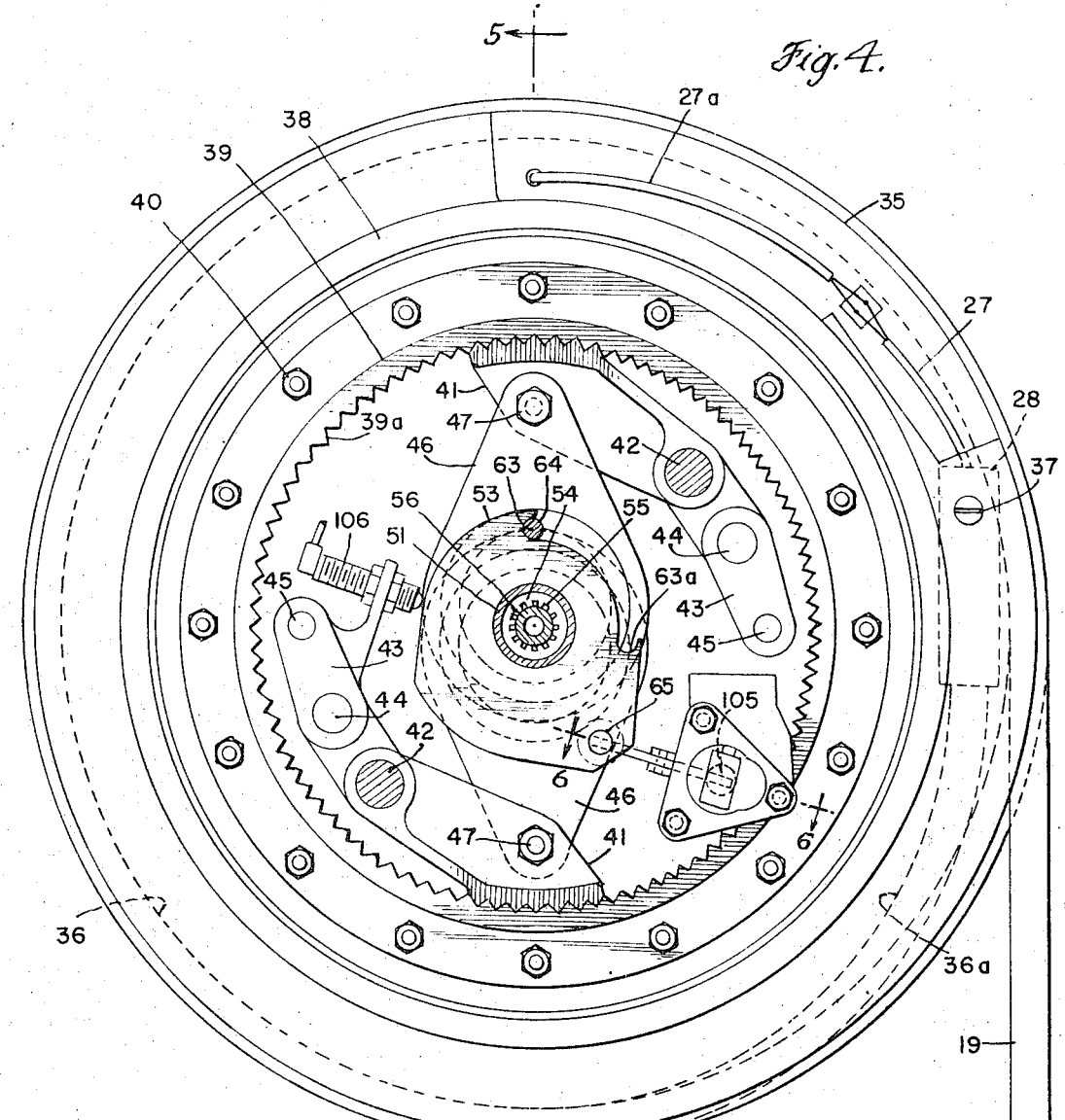
FIG. 4 is a view to an enlarged scale of the upper portion of the reel taken along the lines 4—4, FIG. 5, the housing parts having been omitted for clarity.

Referring to the figures, FIG. 1 shows a helicopter of the lifting crane type having a plurality of rotor blades 11 and a fuselage 12 which includes an operator's compartment 13. Also attached to the fuselage is the main landing gear 14 to which wheels 15 are connected. A similar landing gear structure extends on the opposite side of the fuselage. The forward landing gear is located centrally under the operator's compartment and is shown at 16 with the wheel 17 mounted thereon. Reels 18 are shown attached to the sides of the fuselage 12 and a cable 19 extends from each of the reels 18. A terminal hook 20 is attached to the end of each cable 19 and these are shown connecting into lifting brackets 22 attached to a vehicle 21.

In FIG. 3 the reel is shown attached by mounting bolts 23 to attachment structure 24 and a strut 25 which extends inboard from the reel to the fuselage structure to provide for spacing the reel from the fuselage at the desired distance. With this system a four-point suspension is provided for carrying loads under the fuselage of the helicopter. FIGS. 2 and 3 also show a special terminal fitting 26 for connecting the hook 20 to the cable 19. This is provided for the purpose of indicating when the cable load reaches the maximum allowable. The terminal 26 is connected electrically with the reel system. As will be seen in FIG. 4, an insulated pair of electrical conductors 27 extends throughout the length of the cable 19 and projects beyond the cable anchor terminal 28. (See FIGS. 4 and 5). Conductor wires 27 are connected with wires 27a which extend into the reel electrical system in a fashion which will be described later.

Referring to FIGS. 2 - 5 inclusive, reel is incorporates a housing having central portion 29, inboard plate 30 and outboard plate 31. A lightweight cover member 29a protects the interior from entry of dust and moisture. Cover 29a is omitted from FIG. 3 for clarity. Extension support 32 is attached to the housing parts by bolts 33. The housing plates 30 and 31 are assembled to the central portion 29 by bolts 34. The extendable cable 19 is stored on drum 35 which is constructed with a peripheral groove 36 extending around the drum with a suitable lead to assure proper positioning of the cable when reeled into stored position. As will be best seen in FIG. 4, the last quarter turn of the groove 36 is distorted as shown at 36a to allow the end portion of the cable 19 to be embedded deeper into the drum to position the anchor terminal 28 to lie within the drum radius. A bolt 37 extends through the anchor terminal 28 to attach it to the drum 35.

The drum 35 is supported rotationally on the housing by bearings 38 which are mounted on the inboard and outboard plates 30 and 31. Also supported mainly on the outboard plate 31 is the drum locking mechanism and the manual control therefor. For this purpose a toothed ring 39 is attached to the drum 35 by bolts 40. A pair of toothed shoes 41, 41 are oppositely positioned to be engaged with or disengaged from ring 39. The shoes 41, 41 are each anchored by pivot bolts 42 and anchor fittings 43 which in turn are attached to the outboard plate 31 by bolts 44 and 45. To move anchor shoes 41, 41 into and out of engagement with the teeth 39a of ring 39, a pair of radial plates 46, 46 are pivotally connected to the shoes 41 by the bolts 47, 47. The radial plates 46, 46 are each mounted on eccentric members 48, 48a, bearings 49, 49 being used to assure free rotation between the eccentric members 48, 48a and radial plates 46, 46. The eccentric members 48, 48a are both fastened by suitable means, for example the keys 50, 50 to the shaft 51 which is supported in the outboard plate 31 in a bearing 52, the axis of which is concentric with the axis of rotation of the drum 35. The shaft 51 is constructed with a flange member 53 used to limit the rotational movement of the shaft 51. Also the shaft 51 has an internal spline 54 which mates with the external spline 55 on the central control shaft 56.

The shaft 56, besides being supported for rotational and sliding movement at spline 55, is also supported in cover plate 57 which is mounted on outboard plate 31 by suitable screws 58 (FIG. 2). A sleeve 59 around control shaft 56 retains the shaft in the longitudinal position shown in FIG. 5 under the urging of compression spring 60. The shaft 56 projects outside outboard plate 31 and a handle 61 is connected to the shaft 56 by means of pin 62. The handle 61 is movable through an arc as indicated in FIG. 2 to move the eccentric members 48, 48a sufficiently to disengage the teeth of the tooth shoes 41, 41 from the teeth of the toothed ring 39. The flange member 53 is provided with limit stops 63, 63a (FIG. 4) which engage stop pin 64. A safety lock pin 65 is mounted in the structure of outboard plate 31 and may be moved into hole 66 in flange 53 when the handle 61 is in engaged position as shown by the position of the parts in FIGS. 2, 4 and 5.

Figure 6:
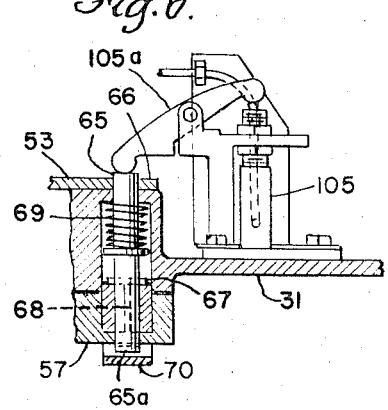
FIG. 6 is a detail view of the safety lock control switch mechanism taken generally in the direction of arrows 6—6, FIG. 4.

In FIG. 6 the lock pin 65 is shown moved into locked position where it is held by rotation of pin 65 (note screwdriver slot 65a for this purpose) so that the small guide pin 67 is moved into position out of registry with its guide slot 68. A spring 69 urges lock pin 65 out of locked position when guide pin 67 is in registry with slot 68. In FIG. 2 it will be noted that plate 70, which normally hangs down as indicated, can be swung about pivot 71 until it covers lock pin 65 when it is in locked position. A detent 72 retains plate 70 until it is desired to unlock the mechanism by releasing lock pin 65. Thus plate 70 can act as an indicator to show when the mechanism is locked.

The handle 61 is retained in either extreme position (locked or unlocked) by spring 73 reacting between plunger 74 and cylinder 75. Plunger 74 engages the handle 61 with a ball end 76 and cylinder 75 is supported on plate 57 by a loosely fitting pivot pin 77. This attachment for the handle retention provides for the swinging movement of the handle 61 as well as for the slight longitudinal movement required for disconnecting the manual control from the electrical as will be explained below.

At the opposite end of the control shaft 56 from the handle 61, an electrical actuator 78 is mounted on inboard housing plate 30 by screws 79 which fasten the actuator to internal axis structure 80 connected to plate 30 by bolts 81. Actuator 78 includes a suitable motor with reduction gearing and electrical controls. Drive shaft 82 extends from the actuator 78 and clutch part 83 is attached to the shaft 82 to provide for engagement with the control shaft 56. An external clutch part 84 formed integral with the control shaft 56 provides an operating connection between the actuator driveshaft 82 and the control shaft 56.

Figure 7:
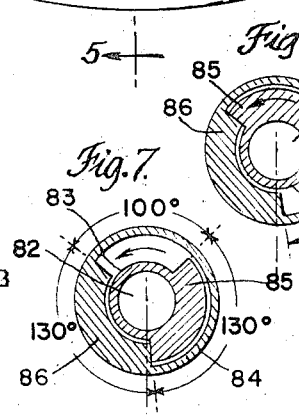
FIG. 7 is a sectional view through the actuator clutch parts showing them in position to engage the brake parts at the completion of the brake engaged cycle.
Figures 8, 9:
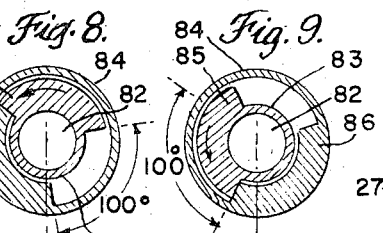
FIG. 8 is a view similar to FIG. 7 but showing the clutch parts in an intermediate position during the brake release cycle.
FIG. 9 is a view similar to FIG. 7 but showing the clutch parts at the full brake release position at the completion of the actuator release cycle.

FIGS. 7, 8 and 9 show the shape and relationship of the clutch parts 83 and 84 for various operating positions. The actuator clutch part 83 is formed with an external projection 85 extending through an arc of 130° as shown in FIG. 7. In somewhat similar fashion an internal projection 86 is formed on clutch part 84 and it also extends through an arc of 130° (FIG. 7). In FIG. 7 the clutch parts 83 and 84 are shown in "drum locked" relationship. To move the mechanism to the "unlocked" position the electrical actuator 78 is energized to move shaft 82 in counterclockwise direction which moves clutch part 83 through 100° lost motion till it reaches the position in FIG. 8 where projection 85 engages the face of projection 86 and continues to move a further 100° carrying clutch part 84 with it to the "unlocked" position shown in FIG. 9. This relationship of projections provides clearance between the non-driving face of projection 85 so that in the event the release mechanism becomes self-energized during the releasing motion the projection 86 will not impact against projection 85 and cause damage to the actuator shaft or mechanism. The locking operation is the reverse of the unlocking. Thus from the position of the clutch parts in FIG. 9, the clutch part 83 and projection 85 responds to reverse energization of actuator 78 to move 100° clockwise till it contacts projection 86 where it then carries it through 100° to the "locked" position of FIG. 7.

Figure 5:
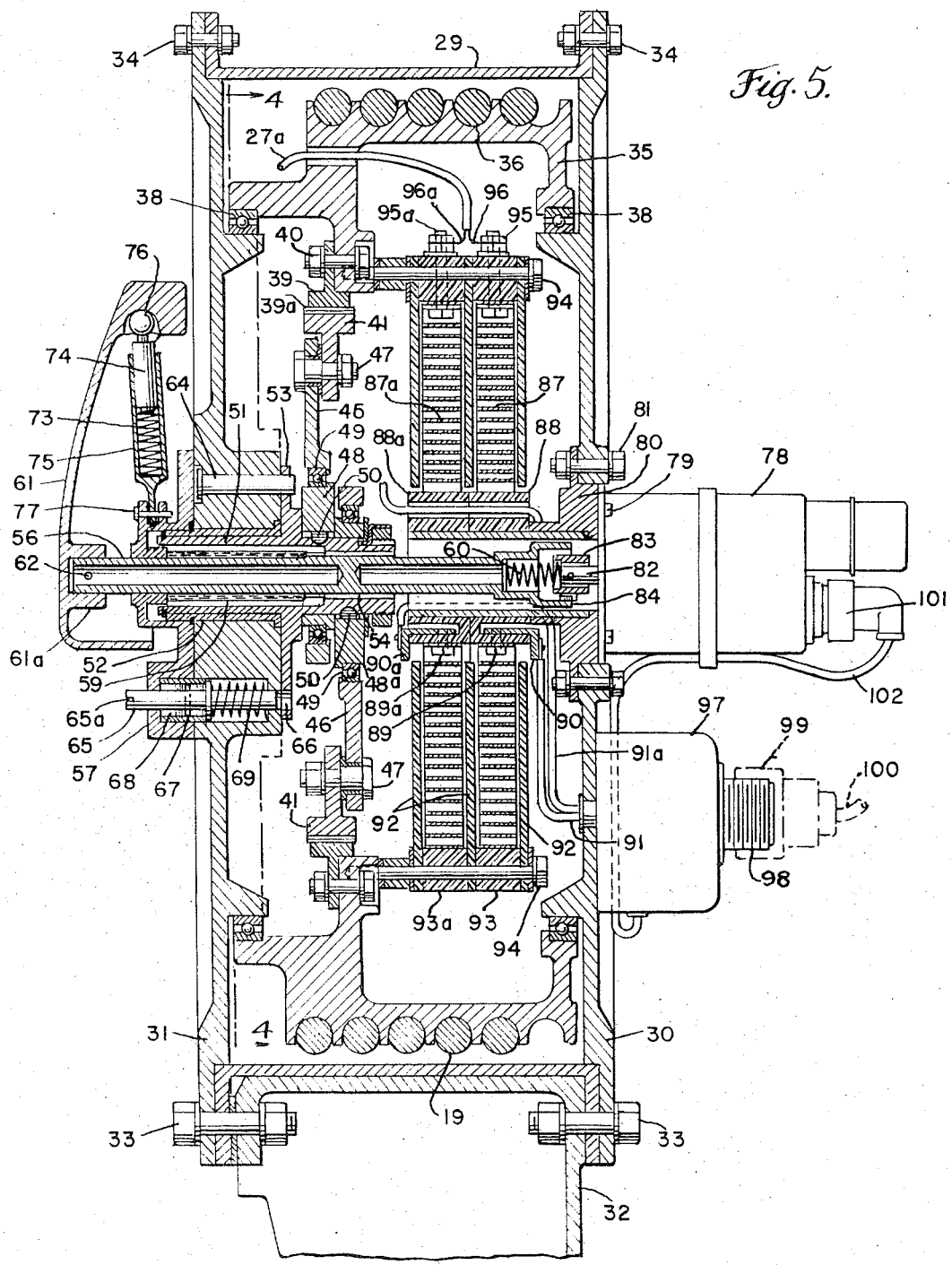
FIG. 5 is a sectional view through the upper portion of the reel taken along the lines 5—5, FIG. 4.

In FIG. 5 it will be seen that the projections 85 and 86 of clutch parts 83 and 84 are in registry with each other. The control shaft 56 may be moved longitudinally a slight amount by pushing in on handle 61 until boss 61a contacts cover plate 57. Thus the spring 60 is compressed and the projection 86 is moved so that it is out of registry with projection 85. The control shaft is thus disconnected from the electrical actuator and the mechanism can be moved manually to unlocked or locked position as desired. Thus the control shaft 56 and the clutch part 84, 86 can be moved from the "locked" position shown in FIG. 7 to the "unlocked" position in FIG. 9, while the actuator shaft and its clutch parts 83, 85 remain in the position of FIG. 7. The projection 86 is then behind the projection 85 and the manual handle remains in its "pushed in" position until either the handle 61 is moved to "locked" position or the electrical actuator is moved to "unlocked" position when the projections are in compatible positions and the clutch parts engage again under the influence of spring 60.

With the mechanism in "unlocked" position, the cable 19 may be pulled out from its retracted position by causing rotation of the drum 35 in the clockwise direction as viewed in FIG. 4. To rewind the cable on the drum a clock type spring (FIG. 5) is provided to react against the housing and the drum to turn it in a counter-clockwise direction. The rewind spring is divided into two separate parts 87, 87a, supported in insulated relationship to each other, to the drum 35 and to housing plate 30. Thus the inner end of each rewind spring 87, 87a is anchored to a hub part 88, 88a of insulating material by suitable bolts 89, 89a which in turn are in engagement with metallic fittings 90, 90a and electrical connections 91, 91a. Three separator plates 92 of insulating material protect the spring parts 87, 87a and plates 92 are supported by outer annular insulating members 93, 93a which are attached to the drum 35 by bolts 94. The outer ends of spring parts 87, 87a are anchored to annular members 93, 93a by bolts 95, 95a which also serve to attack electrical connections 96, 96a forming electrical conductor 27a.

Parts of the electrical system have been described in the foregoing. The complete electrical diagram is shown in FIG. 10 and this will be described with reference to other figures where constructional details are involved. Connector box 97 (FIG. 5) collects all the conductors from the reel unit and connects them into the multiple terminal connector 98. Mating connector 99 carries the conductors illustrated by cable 100 (FIG. 5). Actually all the conductors shown in FIG. 10 above connector 98, 99 are associated with the external controls and the part of the system in the aircraft. The circuits shown below the connector 98, 99 relate to equipment and circuits carried by the reel. Terminal connector 101 connects the actuator 78 circuits into the terminal 98 by cable 102 in FIG. 5. The actuator 78 is shown diagrammatically in FIG. 10 and with the toggle control switch 103 in the full line position shown has moved the actuator shaft 82 and clutch part 83 to the locked position shown in FIG. 7. Upon reaching the locked position internal stops in the actuator mechanism moves limit switch 104 to open the forward circuit $C_1$, and close the reverse circuit $D_1$, $D_3$ so the actuator can be reversed when the toggle switch 103 is moved to dotted line position. Another safety lock switch 105 is inserted in the reverse or unlocking circuit to prevent actuator operation when the safety lock 65 is engaged as shown in FIG. 6 where lock pin 65 engages hole 66 in plate 53 to prevent unlocking of the drum. An arm 105a controls the operation of switch 105 which is of the double throw double contact type. In FIG. 10 switch 105 is shown with the pin 65 in unlocked position so that the mechanism can be unlocked by moving toggle switch 103 to dotted position. Switch 105, as will be seen in FIG. 10, has a second pair of contacts which close circuits $H_1$, $I_1$ when the safety lock pin 65 is in engaged position. Thus in safety locked position indicator light LH lights and unlocking circuit $D_1$, $D_3$ is open.

Another indicator light LG is shown in FIG. 10 and this is controlled by position switch 106 which is actuated by movement of plate 46 of the locking mechanism as will also be observed in FIG. 4. As the mechanism moves the shoes 41 out of locked engagement with ring 39, the first part of the movement of radial plate 46 releases switch 106 to permit it to close into the full line position shown in FIG. 10. This completes the $G_1$, $E_1$ circuit to light LG indicating unlocked status of the reel.

The third indicator light LF shown in FIG. 10 is to indicate the maximum permissible load in cable 19. Terminal 26 (FIG. 2) incorporates a switch 107 which is arranged to close when the terminal 26 is subjected to a predetermined load thus lighting indicator light LF. Conductor 91, 91a are shown in FIG. 5 connecting to the inner ends of the dual springs 87, 87a and connecting at the outer ends with dual wire conductors 27a, 27. Conductor 27 extends through the cable 19 to terminal 26 as described previously.

In FIG. 10 there are shown diagrammatically dual explosive type cable cutters 108, 108a. These are also in FIGS. 2 and 3 and are actuated by an independent electrical system (not shown).

OPERATION

When not in use the reel holds the cable in retracted position and the mechanism will normally be in locked position with the switch 106 open to cause indicator light LG to be unlit. If desired the safety lock may also be engaged causing switch 105 to be in position opposite that shown in FIG. 10 wherein the indicator light LH will be "on" and the unlocking circuit will be open. To use the reel a ground crewman will first remove the safety lock pin 65 to move switch 105 to the position shown in FIG. 10 to close the unlocking circuits $D_1$, $D_3$. The mechanism can then be unlocked by the operator moving toggle switch 103 to the dotted line position. The actuator 78 then goes through its cycle to move the control clutch parts 84, 86 from the position shown in FIG. 7 to the position in FIG. 9. In this position the shoes 41 are out of engagement with the ring 39 and the reel drum 35 is free to rotate against the restraint of spring 87, 87a, when the crewman grasps hook 20 and pulls out the cable 19 to the position desired to engage the load to be attached. When the various cables have been adjusted and attached to the load, the reels may then be locked by the operator. This is done by moving toggle switch 103 to full line position causing the clutch parts 84, 86 to be moved from the FIG. 9 position to the FIG. 7 position. In so moving the mechanism is moved to engage shoes 41 with ring 39 to lock the drum 35 in position to transfer the cable load into the reel ready to be lifted. Normally the crewman will engage safety pin 65 before the load is lifted.

In case of failure of the electrical system, the crewman can at any time disconnect the clutch parts 85, 86 and lock or unlock the mechanism manually. This is done by pushing in on handle 61 against the pressure spring 60 and then rotating the handle 61 to the locked or unlocked position. This puts the clutch parts out of registry and clutch part 86 lies behind clutch part 85 (See FIGS. 5, 7, 8 and 9). To return to normal relationship the handle 61 may be moved to the proper position of the actuator clutch 85 or the actuator may be operated to bring the clutch part 85 into phase with the clutch part 86. Under either condition when the clutch parts 85 and 86 are in proper relative position the clutch will automatically reengage under the influence of spring 60. This actuator clutch arrangement provides a relatively simple and reliable system which permits changing from manual operation to power operation as desired or needed. The lost motion or clearance between the clutch part 85 and clutch part 86 prevents damage to the actuator when self-energizing loads from the teeth cause movement of the mechanism faster than the actuator requires. The actuator is thus protected from reverse drive loads.

A ground crewman by quick visual inspection can tell the condition of the reel. The position of the handle indicates that the reel is either locked or unlocked. The position of the cover plate 70 will indicate whether the safety pin 65 is engaged or released.

Regardless of the extension of the cable, when it is locked the cable can support its load. The outer cable terminal 26 (FIG. 2) includes a switch 107 (FIG. 10) which closes when the preset load is applied to the cable. This completes the circuit to the indicator light LF through various conductors including dual conductors 27, and 27a, individual conductors 96, 96a, spring elements 87, 87a, individual conductors 91, 91a and then into the external circuits through connector 98, 99 (FIG. 5).

We claim:

1. A reel assembly incorporating
   a. a housing,
   b. a drum mounted in said housing for rotation with respect thereto,
   c. a cable having one end anchored to said drum,
   d. a cylindrical member rigidly attached to said housing, with its axis on the axis of said drum,
   e. a wind-up spring assembly,
   f. an outer end attachment for the spring assembly composed of insulating material and being removably connected to said drum, and an inner end attachment for the spring assembly composed of insulating material and supported by said cylindrical member, g. an electrical conductor connected to the outer end of said spring assembly,
   h. and an electrical conductor connected to the inner end of said spring assembly.

2. A reel assembly incorporating
   a. housing,
   b. a drum mounted in said housing for rotation with respect thereto,
   c. a cable having one end anchored to said drum, said cable having a plurality of insulated electrical conductors extending therethrough,
   d. a cylindrical member rigidly attached to said housing,
   e. a wind-up spring assembly having the outer end attached to said drum and the inner end attached to said cylindrical member, said spring assembly being separated into two parallel spring parts,
   f. an outer end attachment for each spring part composed of insulating material and being removably connected to said drum, and an inner end attachment for each spring part composed of insulating material and supported by said cylindrical member,
   g. an electrical conductor connecting the anchored end of one of said cable conductors and the outer end of one of said spring parts,
   h. an electrical conductor connected to the inner end of each of said spring parts to provide for connection of the cable conductors into an electrical system outside of said housing regardless of the degree of wind-up of the cable on the drum.

3. A reel construction according to claim 2 in which the outer end attachment portion is in the form of an annular housing around the spring parts and the annular housing is attached to the drum by a plurality of bolts, a circular disc of insulating material being provided at each side of and between the spring parts.

4. A reel construction according to claim 3 in which the circular discs are retained in position by the annular housing bolts.

5. A reel construction according to claim 3 in which the outer end attachment for each spring part includes a radially extending screw, the outer end of which is adapted to provide for the connection of the outer end electrical conductor.

6. A reel construction according to claim 3 in which the inner end attachment for each spring part includes a screw member which extends radially through a part of the inner attachment portion and also serves as an electrical connection to the inner end conductor.

* * * * *

UNITED STATES PATENT OFFICE
CERTIFICATE OF CORRECTION

Patent No. 3,785,464     Dated January 15, 1974

Inventor(s) LESLIE C. COLLINS, ET. AL.

It is certified that error appears in the above-identified patent and that said Letters Patent are hereby corrected as shown below:

Column 1, line 14, after "central" and before "location", insert -- control -- ; line 17, after "of" and before "cable", "unextended" should read -- extended -- .

Signed and sealed this 6th day of August 1974.

(SEAL)
Attest:

McCOY M. GIBSON, JR.
Attesting Officer

C. MARSHALL DANN
Commissioner of Patents